(12) United States Patent
Gaia et al.

(10) Patent No.: US 10,344,608 B2
(45) Date of Patent: Jul. 9, 2019

(54) SEAL ARRANGEMENT IN A TURBINE AND METHOD FOR CONFINING THE OPERATING FLUID

(71) Applicant: TURBODEN S.R.L., Brescia (IT)

(72) Inventors: Mario Gaia, Brescia (IT); Roberto Bini, Brescia (IT)

(73) Assignee: TURBODEN S.P.A., Brescia (BS) (IT)

( * ) Notice: Subject to any disclaimer, the term of this patent is extended or adjusted under 35 U.S.C. 154(b) by 9 days.

(21) Appl. No.: 15/738,304

(22) PCT Filed: Jun. 8, 2016

(86) PCT No.: PCT/IB2016/053365
§ 371 (c)(1),
(2) Date: Dec. 20, 2017

(87) PCT Pub. No.: WO2016/207761
PCT Pub. Date: Dec. 29, 2016

(65) Prior Publication Data
US 2018/0187566 A1    Jul. 5, 2018

(30) Foreign Application Priority Data

Jun. 23, 2015 (IT) .......................... 102015000026784

(51) Int. Cl.
*F01D 11/00* (2006.01)
*F01D 25/16* (2006.01)
(Continued)

(52) U.S. Cl.
CPC ............ *F01D 11/003* (2013.01); *F01D 11/04* (2013.01); *F01D 25/12* (2013.01); *F01D 25/16* (2013.01); *F01D 25/183* (2013.01);
*F01D 25/32* (2013.01); *F01K 25/00* (2013.01); *F05D 2220/30* (2013.01); *F05D 2240/55* (2013.01); *F05D 2240/60* (2013.01); *F05D 2260/20* (2013.01)

(58) Field of Classification Search
CPC ........ F01D 11/003; F01D 25/12; F01D 25/16; F01D 25/32; F01D 25/183; F01D 11/04; F01K 25/00; F05D 2240/55; F05D 2240/60; F05D 2260/20; F05D 2220/30
USPC .......... 60/651, 671; 415/173.2, 229; 277/579
See application file for complete search history.

(56) References Cited

U.S. PATENT DOCUMENTS

| 4,005,580 A | 2/1977 | Swearingen |
| 4,484,753 A * | 11/1984 | Kalsi ...................... E21B 4/003 277/336 |

(Continued)

FOREIGN PATENT DOCUMENTS

EP    2025879 A2    2/2009

*Primary Examiner* — Hoang M Nguyen
(74) *Attorney, Agent, or Firm* — Volpe and Koenig, P.C.

(57) ABSTRACT

A turbine of an organic Ranking cycle ORC is described, the turbine comprising a shaft supported by bearings and a plurality of seals arranged round the shaft for confining the operating fluid expanding in the turbine. The seals define at least four axially consecutive chambers. The operating fluid, with function of barrier fluid, is fed into one of the chambers adjacent to turbine stages; a gas, preferably inert, is fed into one of the chambers adjacent to the bearings, and the corresponding seals are gas seals. This configuration prevents the operating fluid from any kind of contamination by the lubricant used for the bearings, and avoids polluting the environment.

27 Claims, 9 Drawing Sheets

(51) Int. Cl.
*F01D 25/18* (2006.01)
*F01D 11/04* (2006.01)
*F01D 25/12* (2006.01)
*F01D 25/32* (2006.01)
*F01K 25/00* (2006.01)

(56) References Cited

U.S. PATENT DOCUMENTS

| | | | | |
|---|---|---|---|---|
| 5,267,736 A | * | 12/1993 | Pietsch | B63H 23/321 |
| | | | | 277/306 |
| 7,249,768 B2 | * | 7/2007 | Keba | F16J 15/004 |
| | | | | 277/348 |
| 8,915,708 B2 | * | 12/2014 | Yang | F01D 25/186 |
| | | | | 415/111 |
| 2013/0136583 A1 | * | 5/2013 | Colombo | F01D 11/003 |
| | | | | 415/173.2 |

* cited by examiner (prior art)
FIG.1

SEAL ARRANGEMENT IN A TURBINE AND METHOD FOR CONFINING THE OPERATING FLUID

FIELD OF THE INVENTION

The present invention relates to a seal arrangement in a turbine working in an Organic Rankine Cycle (ORC), and a method for confining the operating fluid in the turbine.

STATE OF THE ART

The abbreviation ORC "Organic Rankine Cycle" usually denotes thermodynamic cycles of Rankine type that use an organic operating fluid preferably provided with high molecular mass, much higher than that of the water vapor used by the vast majority of the Rankine power cycles.

The term ORC Organic Rankine Cycle has been used also to denote cycles with changes of state from liquid to gaseous and vice versa, even with operating fluids other than water, though not "organic" in the strict sense of "containing carbon". For example, ammonia and nitrogen oxides are fluids having these characteristics.

In the plants exploiting this thermodynamic cycle, in order to generate the heat required for vaporizing the organic operating fluid, biomass or waste heats of industrial processes is often used. The operating fluid is expanded in a turbine generally connected to an electric generator for producing electric power.

In most of the Rankine cycle ORC plants, the organic operating fluid must necessarily remain confined in the plant, in order to prevent atmosphere contaminations. On the other hand, air must be prevented from entering the thermodynamic cycle, because oxygen would contribute to oxidation and corrosion of the organic operating fluid and, furthermore, the humidity in the air would pollute the operating fluid.

In this sense, by confining the organic operating fluid, both the leakages of the latter in the surrounding environment and the input of air into the plant must be prevented.

Typically, critical situations arise at interfaces among stationary portions and rotating shafts of the turbine. It is difficult to obtain effective seals for confining the turbine at such interfaces.

Various technical solutions have been proposed.

Figure 1:
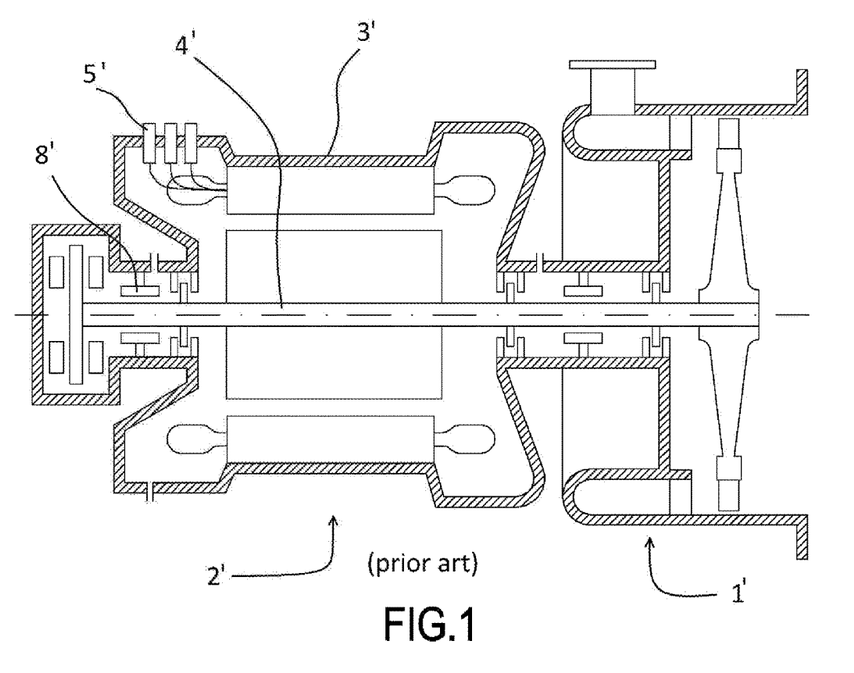
FIG. 1 is a schematic view in axially symmetrical section of a solution sealed between the turbine and the generator, according to the known art.

FIG. 1 shows a classic solution according to the known art: the turbine 1' and generator 2' are directly coupled to each other and isolated inside a casing 3'. The shaft 4' of the turbine 1' and the generator 2' both rotate within the same volume defined by the volute 3' in which there is the operating fluid. The shaft 4' of the turbine does not cross the wall of the casing 3' thereby limiting only to the stationary seal the risk of leakages of the operating fluid. Electric power produced by the generator is transmitted to the outside through convenient electrical connectors 5' constrained to the volute 3' and being obviously fluid tight, to which corresponding cables can be connected. This solution suffers from the drawback of exposing the electric generator to the operating fluid. As the insulation of electric windings of the generator 2' are continuously in contact with the operating fluid, in the long run it can be damaged and impaired.

Figure 2:
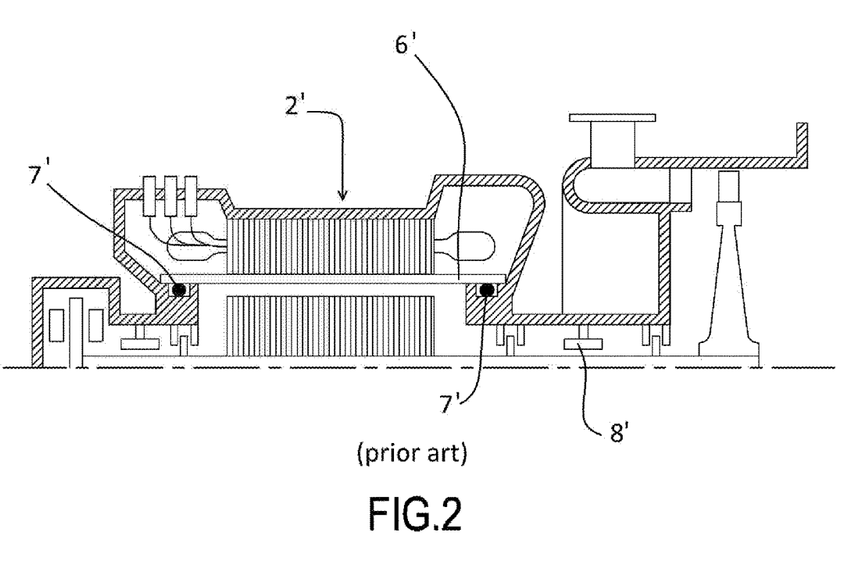
FIG. 2 is a schematic view in axially symmetrical section of another sealed arrangement according to the known art.

FIG. 2 shows an evolution of the previous solution, still according to the known art. The stator part and the rotor part of the generator are kept fluidically separated by a cylindrical partition 6', named liner, and gaskets 7'.

Both the solutions shown in FIGS. 1 and 2 provide the use of a generator 2' specifically designed and sized. This involves higher costs and complications compared with the adoption of a standard type generator available on the market, which also provides higher average reliability.

Additionally, also the bearings 8' (schematically shown) supporting the shaft 4' are exposed to the operating fluid, therefore the latter having to act also as lubricant and cooling fluid. The operating fluid is discharged through suitable ducts. As an alternative to this solution, radial and axial magnetic bearings have been proposed.

As a further drawback, in the gap between the stator and the rotor of the electric generator 2' there is operating fluid; regardless of whether the latter is in the liquid phase or vapor phase, high fluid-dynamic losses arise, certainly greater than those occurring in case the operating fluid is in the gaseous phase of a gas having low molecular mass, such as the air surrounding the rotor of a conventional generator. If there is the liner 6', because of its bulk, the gap must be kept large, and this can lead not to obtain the maximum electrical efficiency for the generator, other conditions unchanged.

Furthermore, in the volume inside the casing 3' saturated by the operating fluid, the positioning of instruments, warning lights, indicators is hampered, both because of the potential damage to the instruments themselves and because connecting elements should cross the sealed casing.

Due to the described drawbacks, in the Rankine cycle ORC plants of medium and large size, from a few hundred kW to over 10 MW, oil-lubricated bearings for supporting the turbine shaft, and a suitable arrangement of fluidic seals to achieve the confinement of the operating fluid in the plant, are used. This solution allows to adopt electric generators of standard type, and it is also possible to introduce a reduction gear between the turbine and the generator thereby optimizing the number of revolutions of the turbine and the generator.

Over the years, many configurations of the fluidic seals have been proposed, in order to achieve the confinement of the process fluid, especially in chemical plants and the oil & gas field. Many of these configurations are described in the ANSI/API regulation Std. 682 and Std. 617.

Figure 3:
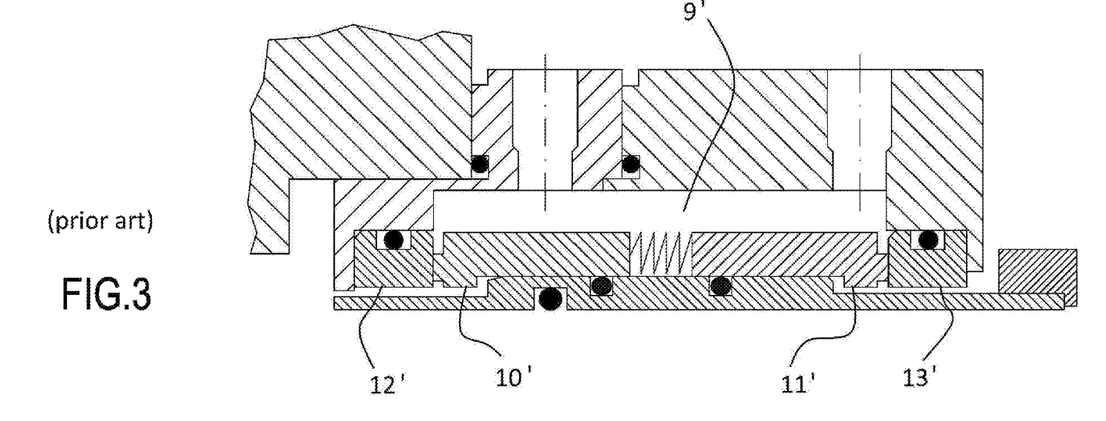
FIG. 3 is a schematic view of an arrangement of seals according to ANSI/API regulation.

FIG. 3 shows one of the configurations provided by the regulation: it is a configuration called "Double seal" or "Tandem seal" of "back to back" type, particularly recommended when a possible leakage of the operating fluid in the environment is unacceptable. The back portion of the seals 10' and 11' abuts against corresponding countercheck elements 12' and 13', i.e. the seals are pushed in the opposed direction. The seals 10' and 11' and the corresponding countercheck elements 12' and 13' reciprocally move due to the rotary movement of the shaft. This is a configuration providing for an intermediate chamber 9' between the bearings supporting the turbine shaft and the zone where the operating fluid expands. Only in the case of "Double seal", which is the most effective solution to ensure the confinement in the intermediate chamber 9' definable buffer chamber, the pressure of a sealing fluid, definable barrier fluid, is kept higher than the pressure of the operating fluid in the adjacent zone of the turbine. Typically, oil or water is used as barrier fluid.

Figure 4:
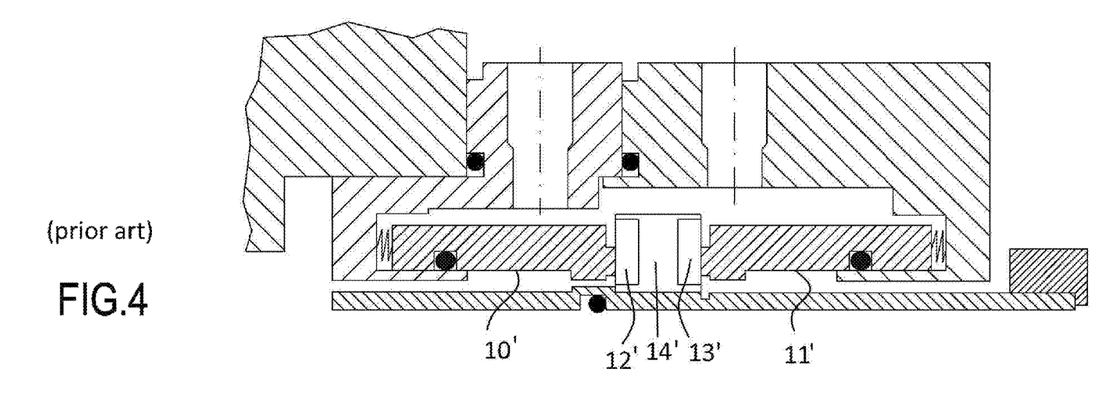
FIG. 4 is a schematic view of another arrangement of seals according to ANSI/API regulation.

FIG. 4 shows another configuration provided by the regulation, this time of "face to face" type, where the seals are pushed against one another. The seals 10', 11' can axially slide so as to move in abutment at the respective front face against only one ring 14' provided between the same seals themselves and having the countercheck elements 12' and 13' thereon.

Figure 5:
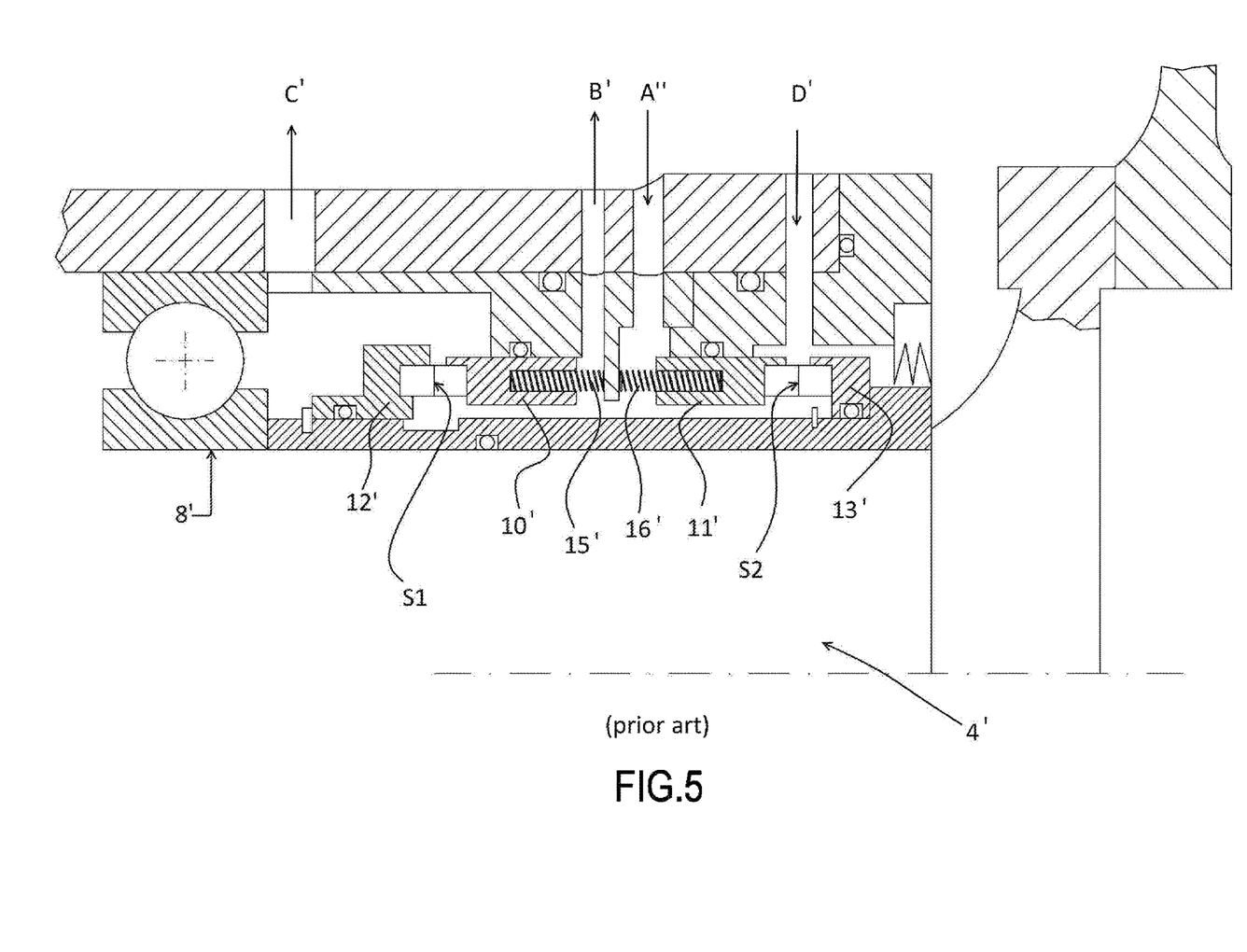
FIG. 5 is a schematic view in axially symmetrical section of an arrangement of seals in a turbine, according to the known art.
Figure 5A:
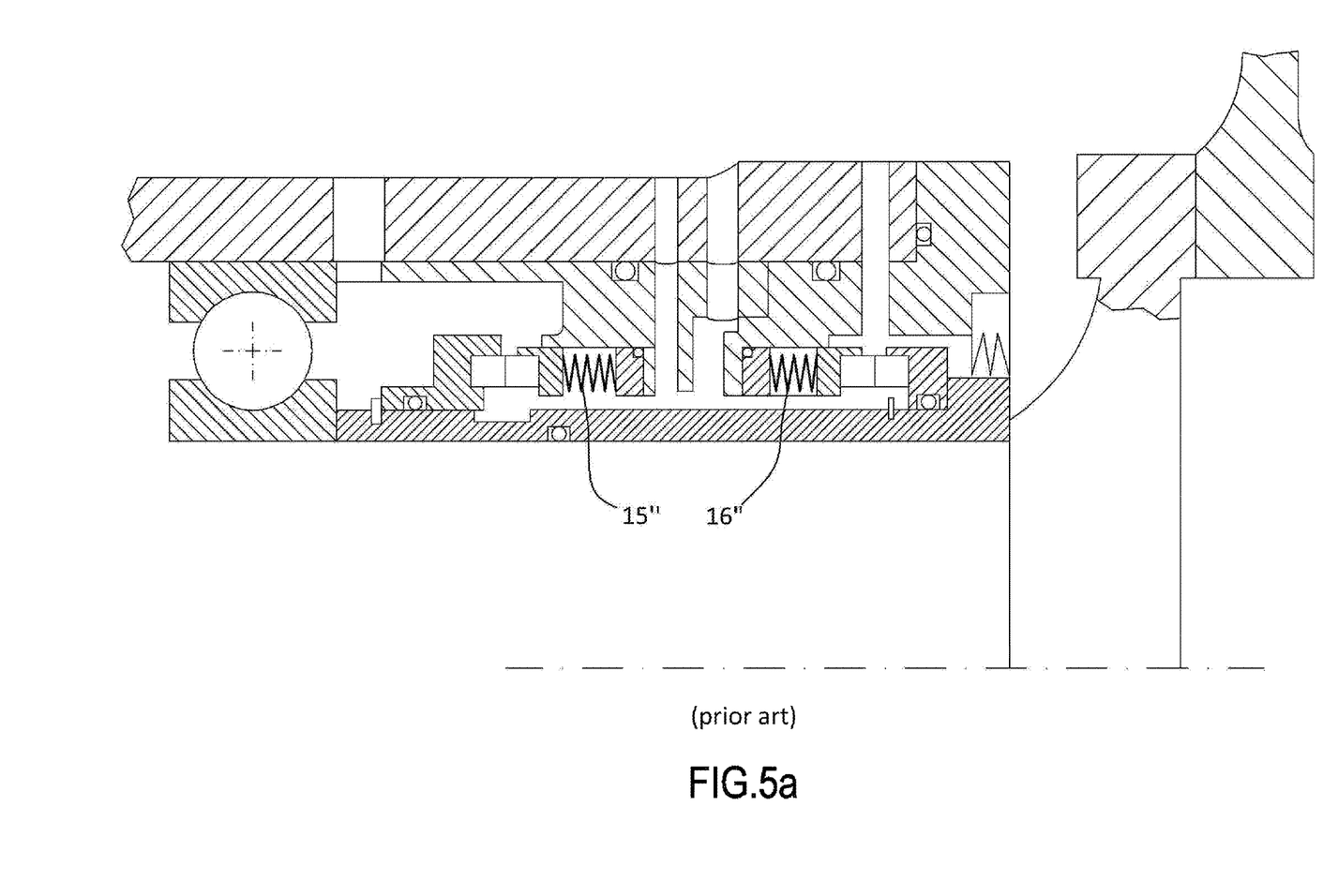
FIG. 5*a* is a schematic view in axially symmetrical section of a variation of the seals arrangement shown in FIG. 5.
Figure 5B:
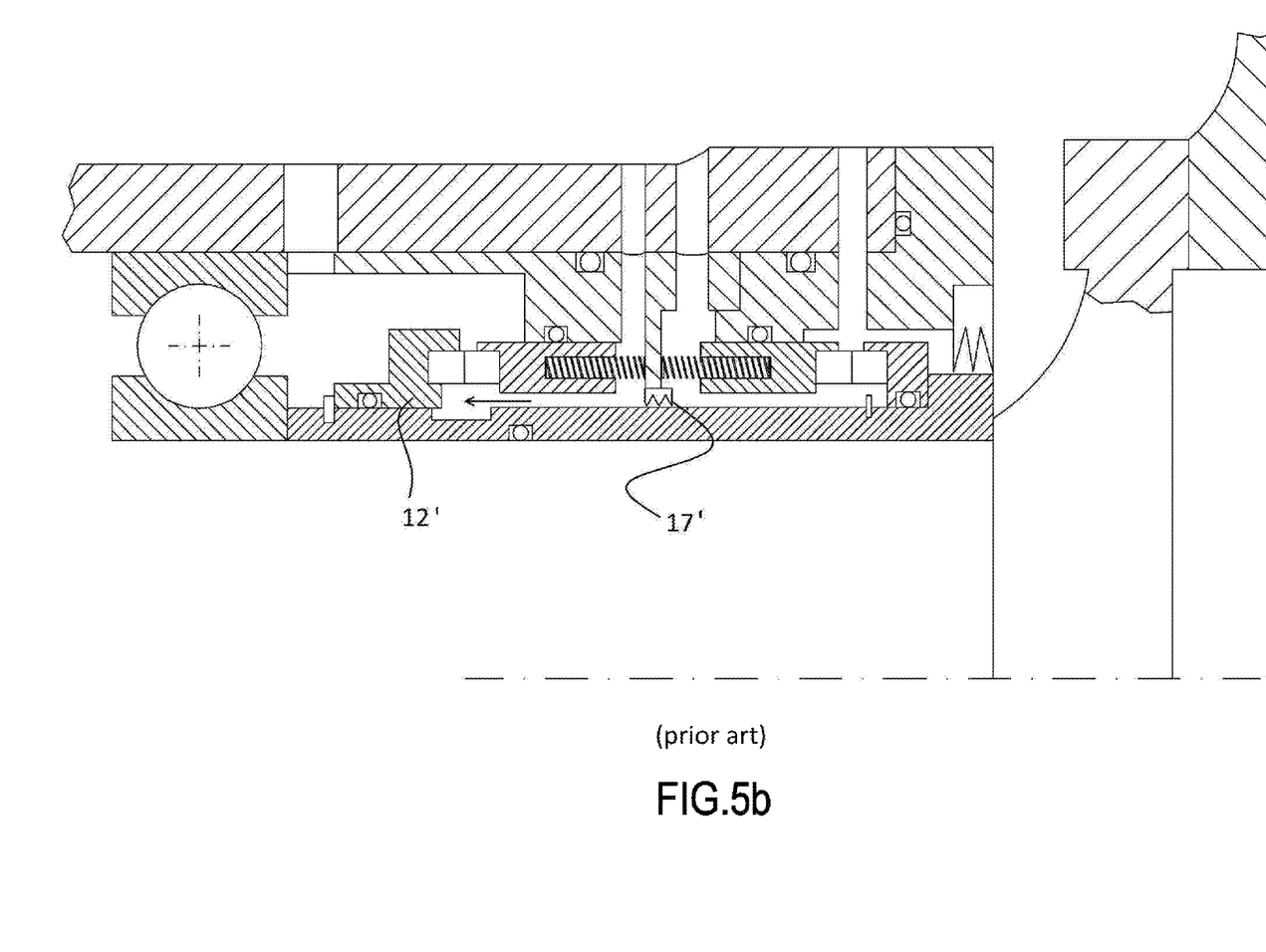
FIG. 5*b* is a schematic view in axially symmetrical section of a variation of the seal arrangement shown in FIG. 5.

FIGS. 5, 5*a* and 5*b* are schematic views in axially symmetrical section of corresponding double-sealed arrangements used in traditional Rankine and not-organic ORC cycle turbines, which are particularly adapted to be used in case the shaft has, at the sliding surfaces, high rotation speed greater than 10 m/s.

In particular, the solution shown in FIG. 5 is of "back to back" type, where the seals 10' and 11' are pushed in opposite directions by corresponding springs 15' and 16' towards the countercheck elements 12' and 13'. Clearly, the sealing is achieved at the S1 and S2 interface between the seal 10' and the countercheck element 12' and between the seal 11' and the countercheck element 13', respectively.

A barrier liquid is fed through a feeding duct A", then is drained by several output ducts B' and C' which might also drain the barrier liquid possibly leaked through the interface S1, if the seal is not perfect. For example, the flow of the mixture containing the possible flow rate of the barrier fluid able to cross the interface S1 and part of the lubricating oil initially fed to the bearing 8', is drained through the duct C'. The same operating fluid expanding in the turbine is fed through D'.

FIG. 5*a* shows a variation, equivalent to that shown in FIG. 5, with the difference that the springs 15' and 16' have been replaced by metal bellows 15" and 16", being more resistant against high temperatures and abrasive action applied by the fluid contaminated by solid substances, for example particulate.

FIG. 5*b* is a variation substantially identical to that shown in FIG. 5, but provided with an additional sleeve 17' connected to the stationary portion of the turbine and provided with helical grooves which generate a fluid-dynamic pumping effect. The viscous friction of the fluid fed between the seals 10' and 11' exerts an action pumping on the fluid itself, in the way determined by the tilt of the helical grooves of the sleeve 17'. Due to the pumping effect, the barrier fluid is thrown against the base of the countercheck element 12' in the form of jet, as denoted by the arrow in figure.

Some embodiments provide that, in order to keep the seal faces separate from each other so as to prevent the relative wear, a minimum and controlled flow rate of barrier fluid leaks through the sealing surface.

Often, solutions provided by the known art do not guarantee the effective confinement of the operating fluid if the latter is organic fluid, such as in Rankine cycles ORC, and the turbine rotates at very high speed, i.e. typically at speeds higher than 10 m/s next to the slide surfaces of the seals.

Furthermore, adopting barrier fluids such as oil or water is problematic in ORC Rankine cycles, as these fluids, if there is a leakage flow to the ORC process, can contribute to thermal degradation of the organic operating fluid, facilitate sediment accumulation and, when present in large amounts in the plant, can interfere with the proper operation of the ORC Rankine cycle.

The Italian Patent Applications BS2014A000159 and BS2014A000160, both filed Aug. 28, 2014 by the Applicant, describe corresponding seal arrangements able to solve the above described drawbacks. Seals are arranged so as three or four chambers arranged in succession along and around the turbine shaft are defined and kept isolated. The organic operating fluid, i.e. the same fluid fed to the turbine, is fed into one of the chambers, that is a buffer chamber, in this case with function of barrier fluid. In this way it is possible to guarantee both that the operating fluid is confined in the turbine and is not contaminated.

The Applicant found that the just described solutions have the drawback that the operating fluid able to pass through the double seal, mixes with the air and oil coming from the zone of the bearings, thereby contaminating the oil. Therefore, the mixture has to be processed in order to separate the operating fluid and reuse the same.

OBJECT AND SUMMARY OF THE INVENTION

It is an object of the present invention to provide a Rankine cycle ORC turbine provided with a seal arrangement alternative to those described in the Italian Patent Applications BS2014A000159 and BS2014A000160, and anyway improved in order to achieve the effective confinement of the operating fluid and preventing it from being contaminated in any operative condition.

Therefore the present invention, in a first aspect thereof, relates to a turbine according to claim 1 of an organic Rankine cycle ORC.

The proposed solution, being set out in a plurality of seal arrangements, simultaneously guarantees to effectively confine the operating fluid in the Rankine cycle ORC, without any possibility of being contaminated by the lubricant of the turbine bearings, and to protect the environment due to the fact that the operating fluid leaked from an intermediate seal joins a flow of preferably inert gas and can be quite easily separated therefrom before releasing the latter in the atmosphere.

Further preferred features of the turbine are described in the dependent claims 2-15.

A second aspect of the present invention concerns a method according to claim 16 for confining the operating fluid in a turbine working in an organic Rankine cycle ORC and for preventing any leakages into the surrounding environment.

Further preferred steps are described in claims 14-24.

A further aspect of the present invention relates to a plant according to one of claims 25-27.

BRIEF DESCRIPTION OF THE DRAWINGS

However, further details of the invention will be evident from the following description made with reference to the attached figures, in which.

DETAILED DESCRIPTION OF THE INVENTION

FIGS. 1-5b relate to solutions according to known art, wherein the generator is sealed with a double seal in a "back to back" and "face to face" configuration, and the respective description is provided at the beginning of the text.

Figure 6:
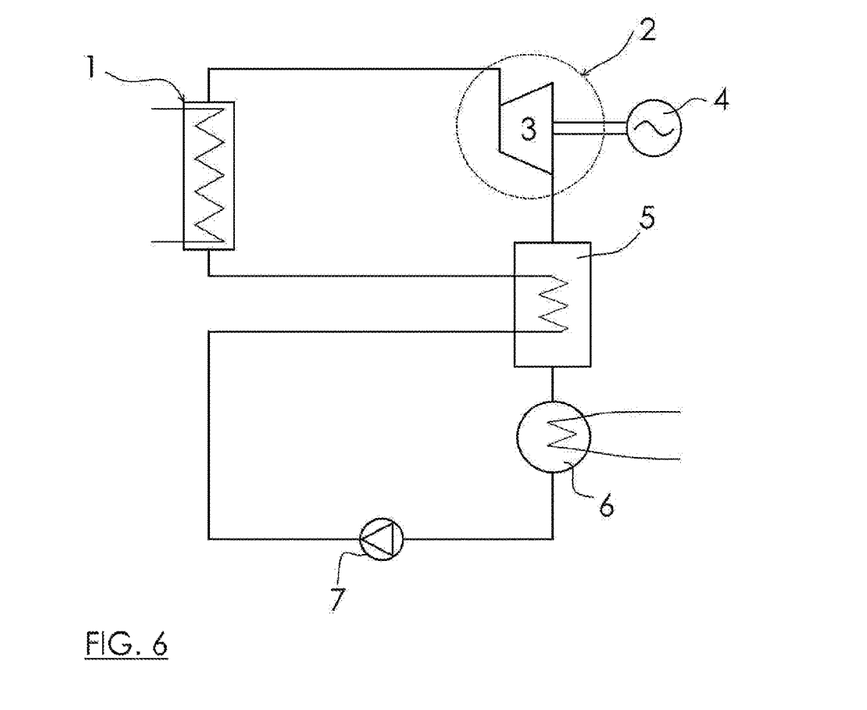
FIG. 6 is a conceptual diagram of a Rankine cycle ORC.

Referring to FIG. 6, a diagram of a typical Rankine cycle ORC is shown. The numeral reference 1 indicates an evaporator combined with a heat source. A turbine assembly and the respective electric generator 4 are schematically shown in the dotted circle 2. Depending on temperatures and characteristics of the operating fluid, a regenerator 5 having the outlet of the turbine 3 connected thereto, can be present or absent. The numeral reference 6 denotes a condenser combined with a cold source and the numeral reference 7 denotes a feeding pump.

Figure 7:
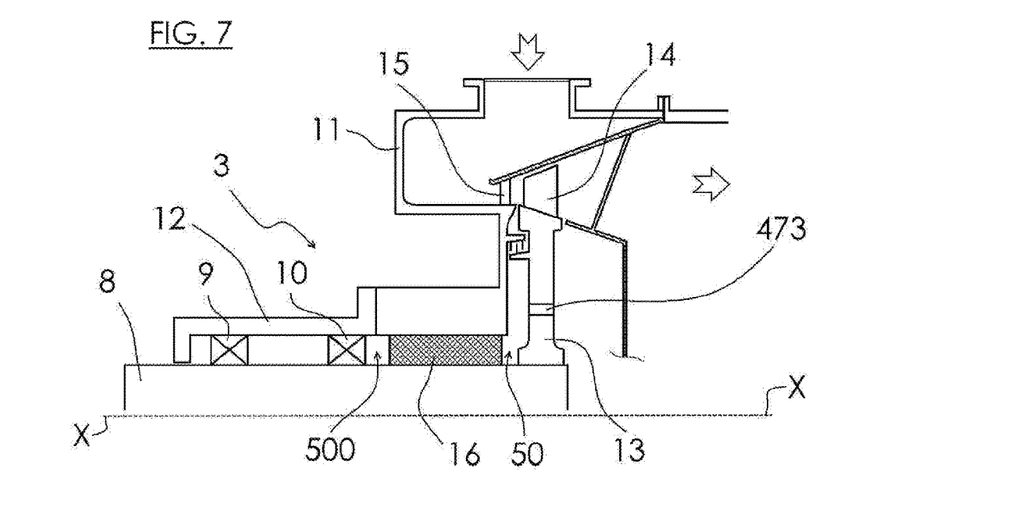
FIG. 7 is a schematic view, partially in axially symmetrical section, of a Rankine Cycle ORC turbine.

FIG. 7 schematically shows a partial sectional view of the turbine 3 shown in the box 2 of FIG. 6.

The turbine 3 comprises a shaft 8 supported by the bearings 9 and 10 on the rotation axis X-X. A volute 11 and a holder-sleeve bearing 12 define the stationary portion. A supporting disc 13 is constrained to the shaft 8 and holds the rotor blades 14; the latter, together with the stator blades 15 supported by the stationary portion, constitute a stage of the turbine 3. The arrows respectively denote the input of the operating fluid in the volute 11 and the output of the (expanded) fluid to the regenerator.

The seals of the turbine, in this figure schematically shown by the rectangle 16, are provided between the bearings 9 and 10 and the supporting disc 13 (and therefore the expanding stage).

As mentioned, at the same time the seals must prevent the operating fluid expanding in the turbine from flowing towards the bearings 9 and 10 and also prevent contaminants, such as the lubricating oil of the bearings, from mixing with the operating fluid in the expansion stage.

Generally, the seals can be arranged in accordance with to 'back to back', 'face to face', or 'face-to-back' schemes, depending on the designer's choice.

FIGS. 8 to 12 are schematic views of corresponding seal arrangements according to the present invention.

It should be recalled that the seals extend circumferentially around the shaft and are coaxial thereto.

Figure 8:
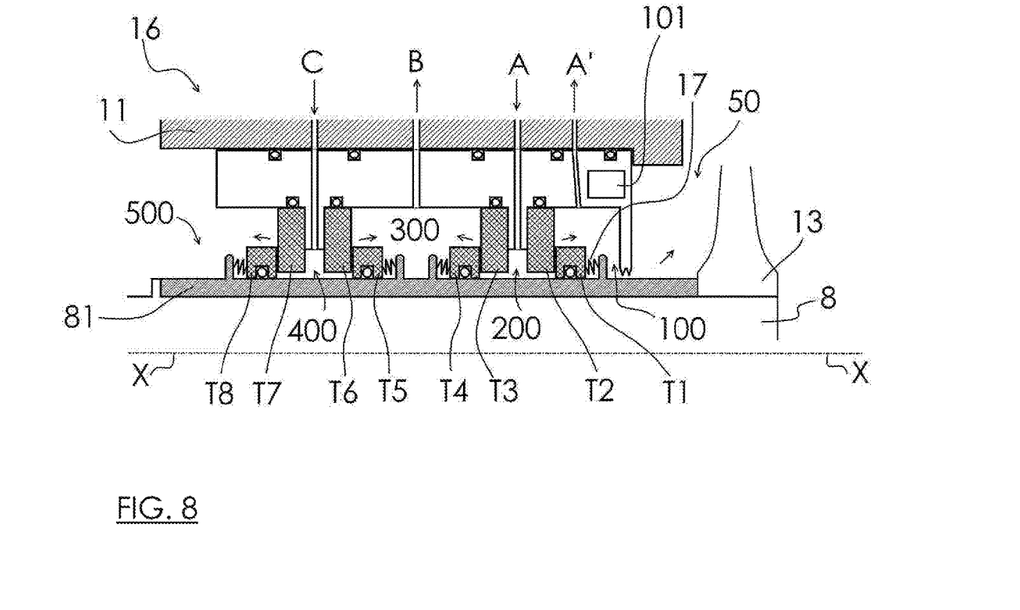
FIG. 8 is a diagram of a first arrangement of seals according to the present invention.

Referring to the first example of FIG. 8, the following chambers, or rooms, are defined:

chamber 50, also visible in FIG. 7, corresponding to one of the inner rooms where the operating fluid making the ORC cycle flows. For example, the chamber 50 can be constituted by the room between the zone 16 of the seals and a rotor disc 13. Preferably, thanks to balancing holes 473, the pressure inside the chamber 50 is equal to the exhaust pressure of the turbine. A fluid fed to this room is then drawn back and mixes with the general flow of operating fluid expanded in the turbine;

chamber 500, also visible in FIG. 7, corresponding to the room between the zone 16 of the seals and the bearings 9 and 10. A gas fed to this room flows in contact with the bearings 9 and 10 supporting the shaft and with the lubricant of the bearings themselves, to be then discharged into the atmosphere, through the usual vents of the lubrication systems;

chamber 200, named buffer chamber, immediately adjacent to the chamber 50 or adjacent to a sub-chamber 100, if present, on the opposite side with respect to the supporting disc 13;

chamber 400, immediately adjacent to the chamber 500 on the opposite side with respect to the bearings 9 and 10;

chamber 300 in-between the chambers 200 and 400;

the sub-chamber 100, which is optional, obtained by dividing the chamber 50 by means of a radial wall 50a, for example provided with a labyrinth 50b. Object of the sub-chamber 100, if present, is to withdraw at least one portion of the leaked fluid directly downstream of the seal defined by the rings T1 and T2. This function can be particularly useful when a high flow rate has leaked, in order to prevent this flow rate from being entirely delivered to the room of the turbine rotor, thus endangering the stability of the rotor itself. Moreover, if there is the sub-chamber 100, this has the function of receiving the leaked fluid in at least partially liquid phase, so that the collected fluid cools down the walls by gradual evaporation.

Numeral reference 101 indicates a circumferential cooling chamber in which a coolant flows.

Chambers 100-500 are separated by suitable ring-shaped elastic seals. It should be noted that figures schematically show the mutual position of the seals but not the respective assembly sequence. Therefore, in practice, the seals are defined by rings having O-rings fitted both on their inner and outer diameters. In order to optimally balance the rotating parts of the turbine 3, the seal rings can be in positions different from the position shown in the accompanying figures, still remaining within the scope of the present invention.

In FIG. 8, where there is the sub-chamber 100, the following seal rings are shown:

the seal ring T1 is rotationally integral with the bushing 81 of the shaft 8 and, therefore, the shaft itself. An elastic element 17 pushes the ring T1 towards the corresponding stationary seal ring T2;

the seal ring T2 is integral with the stationary portion of the turbine 3 and, therefore, does not rotate on the X-X axis;

the seal ring T3 is similar to the ring T2 but is positioned so as to interface with the seal ring T4;

the seal ring T4 is rotationally integral with the bushing 81 of the shaft 8 and, therefore, the shaft itself. An elastic element 17 pushes the ring T4 towards the corresponding stationary seal ring T3;

the seal ring T5 is rotationally integral with the bushing 81 of the shaft 8 and, therefore, the shaft itself. An elastic element 17 pushes the ring T1 towards the corresponding stationary seal ring T6;

the seal ring T6 is integral with the stationary portion of the turbine 3 and, therefore, does not rotate on the X-X axis;

the seal ring T7 is similar to the ring T6 but is positioned so as to interface with the seal ring T8;

the seal ring T8 is rotationally integral with the bushing 81 of the shaft 8 and, therefore, the shaft itself. An elastic element 17 pushes the ring T8 towards the corresponding stationary seal ring T7.

It should be noted that the sub-chamber 100 and the chamber 50 are not separated by seals, but by a labyrinth 50b.

Once the seal rings are in abutment each against the corresponding ring (actually the distance is in the range 1-10 microns), a barrier obstructing the fluid passage is created.

Operating fluid, i.e. the same fluid expanding through the stage of the turbine 3, is fed into the chamber 200 by means of inflow channels A. The pressure of the operating fluid in the chamber 200 is denoted by $p_{200}$.

A flow rate of the operating fluid is withdrawn from the sub-chamber 100, if present, by means of outlet channels A' and can be delivered (preferably) to the condenser. The pressure of the operating fluid in the chamber 100 is denoted by $p_{100}$.

In the chamber 50 the pressure is denoted by $p_{50}$ and typically corresponds to the exhaust pressure from the turbine, although pressure losses through the balancing holes and the effects of a possible diffuser at the outlet of the turbine must be considered.

Due to the leakage through the seals T5/T6 and T3/T4, fluid may accumulate in the chamber 300 and is withdrawn therefrom by means of outlet channels B. In the chamber 300, the pressure is denoted by $p_{300}$.

A preferably inert gas, such as nitrogen $N_2$ or argon Ar or carbon dioxide $CO_2$, is fed into the chamber 400 by means of inflow channels; otherwise, in order to keep the pressure values given below, filtered air is fed; although air is not considered as an inert gas, for the above mentioned purposes it can be considered, to a good approximation, to be similar.

Preferably, the inert gas is selected so as to have a minimum solubility in the operating fluid in liquid phase. For example, a solubility threshold that can be considered is 1000 PPM if there is 20° C. liquid subcooling with respect to the saturation temperature.

In the chamber 400, the gas pressure is denoted by $p_{400}$. Therefore, the seals T5-T8 are gas seals, known as 'dry gas seals'. Preferably, the seal rings are made of silicon carbide, or silicon or carbon nitride.

When the turbine 3 is stationary, the rings of the gas seals contact each other and when the turbine rotates they move away (by few microns, actually): the gas flows from the higher pressure chamber to the lower pressure one, with a flow rate being a function of the pressure difference, the geometry of the rings, the rotation speed, the distance between the rings.

The surface of the seal rings, designed to come in contact with another seal ring, is preferably coated with diamond powder bound with a suitable binder (e.g. sintered cobalt), or with sintered diamond, so as to provide high thermal conductivity and surface hardness.

In practice, by keeping the following pressure conditions:

$$p_{300} < p_{200} \tag{1}$$

$$p_{50} < p_{200} \tag{2}$$

$$p_{300} < p_{400} \tag{3}$$

$$p_{500} < p_{400}. \tag{4}$$

an optimal confinement of the operating fluid in the turbine 3 is achieved.

If there is the sub-chamber 100, along with the above listed conditions, it is also required to keep the following condition: $p_{200} > P_{100} > p_{50}$.

If the seal defined by the rings T1 and T2 does not completely prevent the passage of fluid, the operating fluid injected into the buffer chamber 200 as barrier fluid may flow at most in the chamber 50 (through the sub-chamber 100, if present) and from there back to the process.

If the seal defined by the rings T3 and T4 does not completely prevent the passage of fluid, a portion of the operating fluid injected into the buffer chamber 200 as barrier fluid can flow into the chamber 300 where it can mix with the gas possibly passed through the seal defined by the rings T5 and T6.

If the seal defined by the rings T3 and T4 does not completely prevent the passage of gas, a portion of gas will leak into the chamber 500 towards the bearings 9 and 10 and, possibly, in the atmosphere. Clearly, being the gas a preferably inert gas as already mentioned and being easy to be separated from the lubricant, for example by known coalescent filters, this event does not cause problems of atmospheric pollution. It should be noted that, as regards the duration of the lubricating fluid, the presence of the inert gas can be advantageous with respect to the normal operation in air.

The fluid that can accumulate in the chamber 300 can be operating fluid, inert gas or a mixture of the two. In the latter case, the mixture withdrawn by the ducts B is delivered to a processing plant for recovering the operating fluid, i.e. to decontaminate it from the inert gas.

The arrows show the direction of the flows through the seals.

Preferably pressures are selected so that, in working conditions:

$$2 < p_{400} < 4 \text{ bar, (absolute pressure)}, \tag{5}$$

$$p_{300} \leq p_{200} - 30000 \text{ Pa}, \tag{6}$$

$$p_{400} \geq p_{300} + 20000 \text{ Pa}, \tag{7}$$

$$p_{400} \geq p_{500} + 20000 \text{ Pa}, \tag{8}$$

$$P_{200} > P_{saturation} + 100000 \text{ Pa} \tag{9}$$

wherein $P_{saturation}$ means the vapor pressure of the barrier fluid at the adduction temperature in the chamber 200.

The condition (6) ensures that the direction of flow can be only from the chamber 200 to the chamber 300. The conditions (7) and (8), together, ensure that no lubricant can flow from the bearings 9, 10 to the chamber 300.

Preferably, the leakage of operating fluid through the seals T1 and T2 must be greater than or equal to 0.2 cu·cm/hour per centimeter of the inner perimeter of the seal ring T1.

In the condition in which the first chamber 50 and the buffer chamber 200 are adjacent, without interposition of the sub-chamber 100, it is preferable that:

$$P_{200} > P_{50} + 80000 \text{ Pa}. \tag{11}$$

Metal bellows can be used in place of the elastic elements 17, i.e. the springs.

Figure 9:
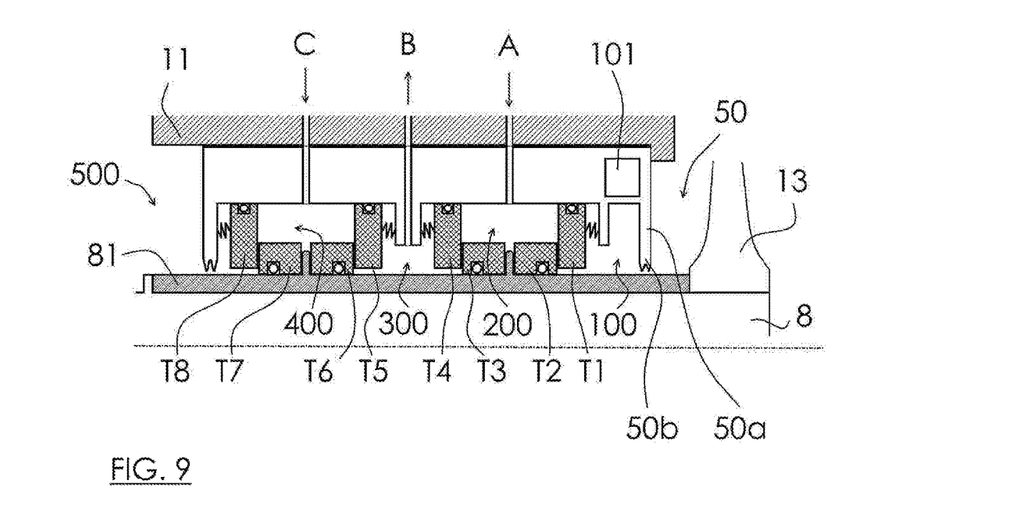
FIG. 9 is a diagram of a second arrangement of seals according to the present invention.

FIG. 9 shows a second configuration. As in the previous configuration, eight seal rings T1-T8 are provided, although in this case the seals T1, T4, T5 and T8 do not rotate together with the shaft 8 whereas the seals T2, T3, T6 and T7 rotate together with the shaft 8. The seals T1, T4, T5 and T8 are axially pushed towards the corresponding seals T1, T4, T5 and T8 by the action of the elastic elements. If the seals T2, T3, T6 and T7 must rotate at high speed, this configuration is preferable.

In an embodiment, at least the seals T5-T6, T7-T8, or even the seals T1-T2 and T3-T4, are equivalent to those described in U.S. Pat. No. 3,819,191. They are rings generating a radial seal against the outer surface of the turbine shaft and a side seal with respect to a complementary stationary ring.

Figure 10:
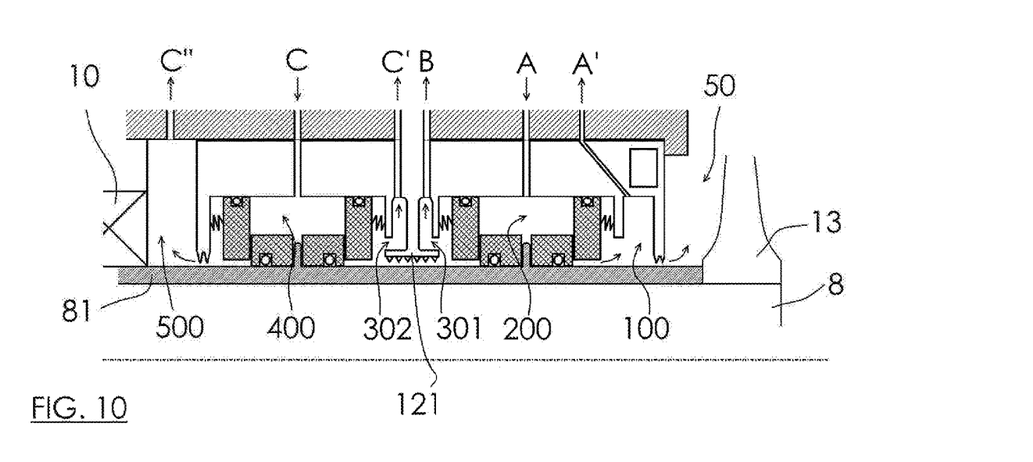
FIG. 10 is a diagram of a third arrangement of seals according to the present invention.

In the configuration shown in FIG. 10 there is a labyrinth element 121. Therefore, the single chamber 300 of the above described solutions is herein divided in two chambers 301 and 302. Operating fluid is fed into the buffer chamber 200 by means of inflow channels A to function as barrier fluid; recovered operating fluid is withdrawn from the sub-chamber 100, if present, by means of outlet channels A'. If there isn't the sub-chamber 100, the leaked fluid directly flows to the chamber 50. Gas, preferably inert and preferably nitrogen $N_2$, is fed into the chamber 400 through inflow channels C. If the inert gas is able to pass through the seals dividing the chambers 400 and 500, then it is withdrawn from the chamber 500. The inert gas which may pass through the seals dividing the chambers 400 and 302, is withdrawn from the chamber 302 through discharge outlets C'. The mixture of inert gas and operating fluid is withdrawn from the chamber 301 through discharge outlets B; the inert gas could pass from the chamber 302 to the chamber 301 through the gaps between the labyrinth element 121 and the bushing 81, whereas the operating fluid, in liquid or aeriform phase, could reach the chamber 301 leaking through the seals that separate this chamber from the buffer chamber 200. The advantage of this configuration is that, if inert gas is present in the chamber 302, it can be ejected into the atmosphere (only if $P_{302}>P_{301}$ is verified by suitably measuring the two values) and only a fraction passes into the chamber 301. Also in this case, the mixture withdrawn by the channels B must be processed to separate the inert gas from the operating fluid.

Figure 11:
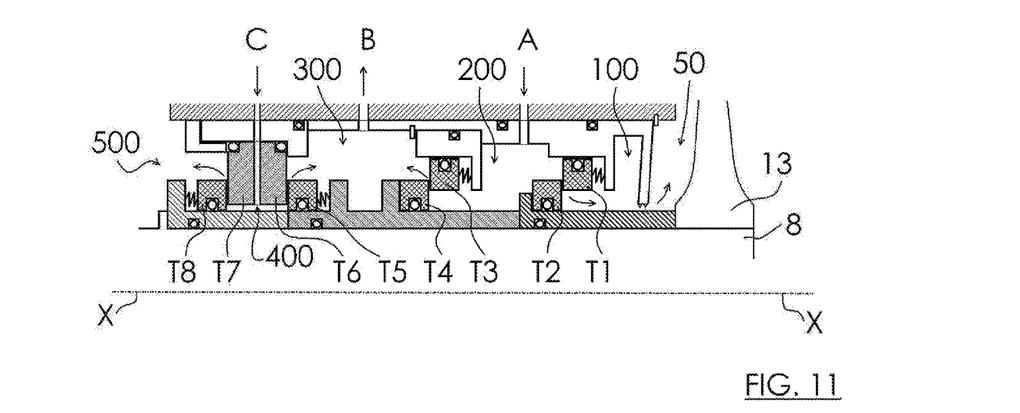
FIG. 11 is a diagram of a fourth arrangement of seals according to the present invention.

FIG. 11 shows another configuration. The gas seals are those corresponding to the rings T5-T8. The seals corresponding to T1-T4 are rings in the front-to-back configuration.

Figure 12:
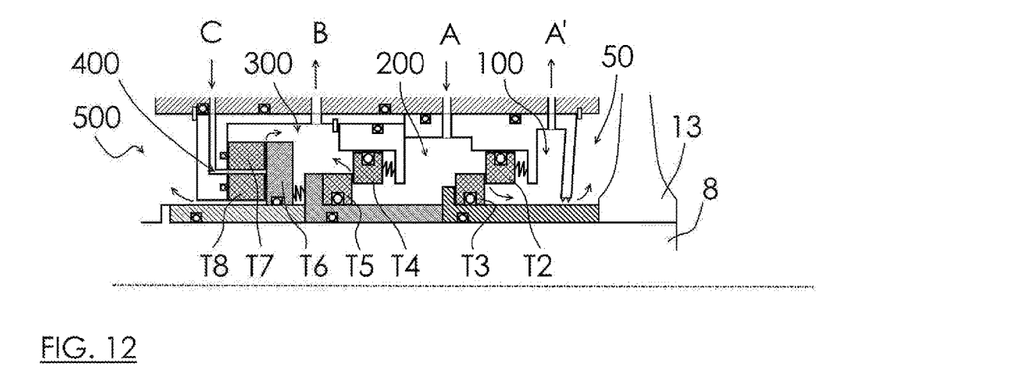
FIG. 12 is a diagram of a fifth arrangement of seals according to the present invention.

FIG. 12 shows another seal arrangement according to the present invention, in which the seal rings T8 and T9 of the gas type are radially arranged on different diameters in order to reduce the overall axial dimension of the seal assembly 16. The inert gas injected into the chamber 400 through the ducts C can pass at most into the chamber 500 through the seals T8 and T6, and into the chamber 300 through the seals T7 and T6. The operating fluid injected into the buffer chamber 200 can pass at most into the chamber 300 through the seals T4 and T5, and into the chamber 100 through the seals T3 and T2. A mixture of inert gas and operating fluid can therefore be formed in the chamber 300, as described in the previous examples.

The separate rings T7 and T8 can be effectively replaced by a single ring being fed at an intermediate position through the channel C.

Figure 13:
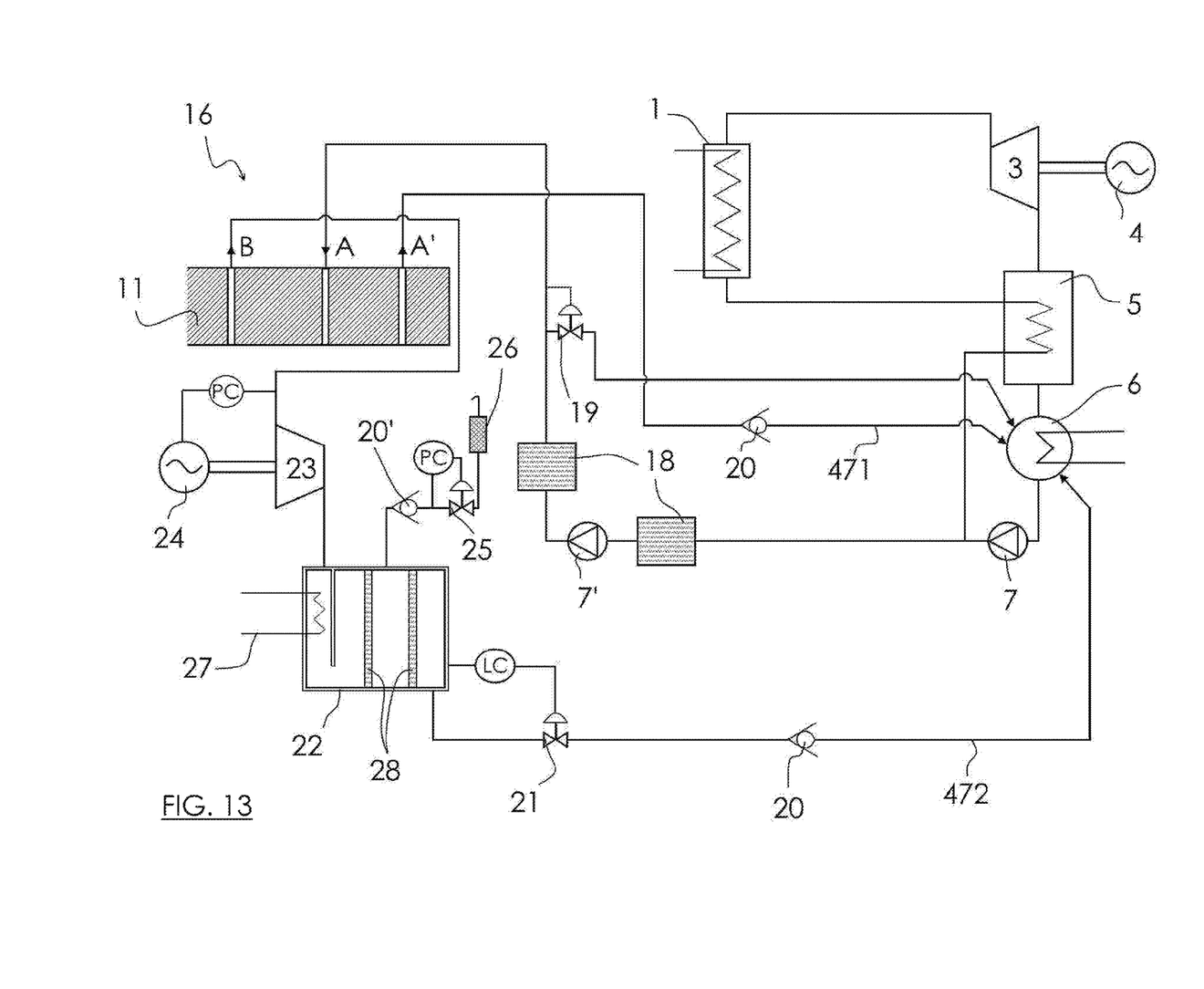
FIG. 13 is a diagram of a Rankine cycle ORC plant according to the present invention.

FIG. 13 shows an exemplary plant to recover the operating fluid, i.e. to separate the operating fluid from any contaminants; additional components with respect to a simple Rankine cycle ORC plant can be found out by a comparison with FIG. 6.

The numeral reference 18 indicates two filters arranged along the line conveying the operating fluid in liquid phase from the condenser, preferably downstream of the feeding pump 7, to the inflow channels A of the seal zone 16 (only schematically shown in this figure), i.e. to the buffer chamber 200 in order to act as barrier fluid. Along the line a pump 7' is provided.

There are two filters 18, because the upstream one protects the pump from possible solid particulate, the downstream one purifies from the fine particulate (range of 1-5 micrometers) and the possible water present therein. The filters are preferably redundant in pairs, to allow for cleaning without having to stop the process.

A relief valve 19 is designed to vent the operating fluid towards the condenser 6 when a threshold pressure is exceeded, the latter being set so that the barrier fluid is properly fed to the chamber 200. The valve 19 is connected to a line 471 conveying the operating fluid from the outlet A' to the condenser 6.

The mixture withdrawn from the chamber 300 through the outlet ducts B, and comprising operating fluid and inert gas, is compressed in the compressor 23 driven by the electric motor 24, and delivered to the unit 22.

Preferably, the pressure $P_{300}$ is adjusted by acting on the rotation speed of the motor 24.

The unit 22 is provided with a chiller 27 to cool the mixture, at inlet temperatures preferably comprised between −20° C. and +10° C., and with coalescent filters 28 intercepting the operating fluid. In practice, the fluid is separated from the inert gas by a low temperature condensation: at the processing temperatures, one of the mixture components is condensible, whereas the other is gaseous. The fraction of inert gas separated from the operating fluid is vented in the atmosphere through a vent pipe 26 preferably provided with an activated carbon filter. The relief valve 25 keeps under control the upstream pressure along the line.

The decontaminated operating fluid is delivered to the valve 21 and then again to the condenser 6, to be completely recovered. The abbreviation PC denotes the pressure control ruled by the valve; the abbreviation LC denotes the liquid flow rate control ruled by the valve.

The numeral references 20 and 20' indicate corresponding one-way valves.

The invention claimed is:

1. A turbine (3) of an Organic Rankine Cycle ORC, comprising:
   a shaft (8) supported by bearings (9, 10) and a plurality of seals, the seals being defined by rings (T1-T8) and arranged around the shaft (8) for confining the operating fluid expanding in the turbine,
   wherein the seals (T1-T8) are arranged so that to define a first chamber (50), a second chamber (200) designated as a buffer chamber, a third chamber (300) and a fourth chamber (400),
   wherein the first chamber (50) is communicating with the environment in which the ORC cycle is made and is adjacent to the buffer chamber (200), and the fourth chamber (400) is between the bearings (9, 10) and the third chamber (300), and the third chamber (300) is between the buffer chamber (200) and the fourth chamber (400), and
   wherein the operating fluid is fed into the buffer chamber (200) as barrier fluid, and
   a gas is fed into the fourth chamber (400) and the seals (T5-T6), which separate the fourth chamber (400) from the third chamber (300), are gas seals.

2. The turbine (1) according to claim 1, wherein between the first chamber (50) and the buffer chamber (200) a sub-chamber (100) is interposed and separated from the first chamber (50) by apposite seals or a labyrinth (50b) element (50).

3. The turbine (1) according to claim 2, wherein a pressure in the sub-chamber (100) is denoted by $P_{100}$, a pressure in the buffer chamber (200) is denoted by $P_{200}$ and said pressures are set so that the following condition is fulfilled:

$$P_{200}>P_{100}+40000 \text{ Pa}$$

4. The turbine (1) according to claim 1, wherein the seals (T7-T8) separating the fourth chamber (400) from the bearings (9, 10) are gas seals.

5. The turbine (1) according to claim 1, wherein a pressure in the first chamber (50) is denoted by $P_{50}$, a pressure in the second chamber (200) is denoted by $P_{200}$, a pressure in the third chamber (300) is denoted by $P_{300}$, the pressure in the fourth chamber (400) is denoted by $P_{400}$, a pressure in a fifth chamber (500), corresponding to a zone in which the bearings (9, 10) are arranged, is denoted by $P_{500}$, and the following conditions are set:

$$P_{300} < P_{200} \tag{1}$$

$$P_{50} < P_{200} \tag{2}$$

$$P_{300} < P_{400} \tag{3}$$

$$P_{500} < P_{400} \tag{4}$$

6. The turbine (1) according to claim 5, wherein the following conditions, referring to an absolute pressure, are set:

$$2 < P_{400} < 4 \text{ bar}, \tag{5}$$

$$P_{300} \leq P_{200} - 30000 \text{ Pa}, \tag{6}$$

$$P_{400} \geq P_{300} + 20000 \text{ Pa}, \tag{7}$$

$$P_{400} \geq P_{500} + 20000 \text{ Pa}, \tag{8}$$

$$P_{200} > P_{saturation} + 100000 \text{ Pa} \tag{9}$$

wherein $P_{saturation}$ means a vapor pressure of the barrier fluid at an adduction temperature in the buffer chamber (200), and in the condition in which the first chamber (50) and the buffer chamber (200) are immediately adjacent, without interposition of other chambers:

$$P_{200} > P_{50} + 80000 \text{ Pa} \tag{10}$$

7. The turbine (1) according to claim 1, wherein a pressure $P_{200}$ in the second chamber (200) is of at least 1 bar higher than a vapor pressure of the barrier fluid at an inlet temperature in the buffer chamber (200).

8. The turbine (1) according to claim 1, wherein the third chamber (300) is fluidically connected to a separating unit (22) to separate the operating fluid from possible aeriform fluids, for a reuse thereof.

9. The turbine (1) according to claim 2, having one or more of the following features:
the sub-chamber (100) is cooled by means of a coolant flowing in an adjacent cooling channel (101);
a portion of the barrier fluid, if leaked through the seals (T1, T2) separating the sub-chamber (100) and the buffer chamber (200), is recovered from the sub-chamber (100).

10. The turbine (1) according to claim 1, wherein the seals (T1-T8) are rings arranged around the shaft (8) in successive axial positions.

11. The turbine (1) according to claim 1, wherein at least some of the seals (T5-T6; T7-T8) are of radial type, in that they apply a seal on the cylindrical surface of the shaft (8) or of a sleeve provided on the shaft (8).

12. The turbine (1) according to claim 1, wherein at least some of the seals (T5-T6; T7-T8) are rings generating a radial seal against the outer surface of the turbine shaft (8) and generating a side seal with respect to a complementary stationary ring.

13. The turbine (1) according to claim 1, wherein at least the seals (T6-T8) separating the fourth chamber (400) from the bearings (9, 10) are coaxial rings radially arranged around the shaft (8), at different diameters or even constituted by only one static ring with an intermediate passage.

14. The turbine (1) according to claim 1, wherein the gas is inert.

15. The turbine (1) according to claim 1, wherein the gas delivered to the seals (T6-T8) separating the fourth chamber (400) from the bearings (9, 10) is filtered and dehumidified.

16. A method for confining the operating fluid in a turbine (3) working in an Organic Rankine Cycle ORC, where the turbine (3) comprises a shaft (8) supported by bearings (9, 10) and a plurality of seals (T1-T8) arranged around the shaft (8) for confining the operating fluid expanding in the turbine (3), the method comprising:
arranging the seals (T1-T8) so as to define a first chamber (50), a second chamber (200) designated as a buffer chamber, a third chamber (300) and a fourth chamber (400),
wherein the first chamber (100) is between expansion stages of the turbine and the buffer chamber (200), the fourth chamber (400) is between the bearings (9, 10) and the third chamber (300), and the third chamber (300) is between the buffer chamber (200) and the fourth chamber (400), and
feeding the operating fluid, with function of barrier fluid, into the buffer chamber (200),
separating the fourth chamber (400) from the third chamber (300) by gas seals (T5-T6), and
feeding a gas in the fourth chamber (400).

17. The method according to the claim 16, further comprising:
arranging additional seals or a labyrinth (50b) to define a sub-chamber (100) between the buffer chamber (200) and the first chamber (50).

18. The method according to claim 17, wherein the pressure in the sub-chamber (100) is denoted by $P_{100}$, the pressure in the buffer chamber (200) is denoted by $P_{200}$ and pressures are set so that the following condition is fulfilled:

$$P_{200} > P_{100} + 40000 \text{ Pa} \tag{11}$$

19. The method according to claim 16, wherein the seals (T7-T8) separating the fourth chamber (400) from the bearings (9, 10) are gas seals.

20. The method according to claim 16, wherein a pressure in the first chamber (50) is denoted by $P_{50}$, a pressure in the second chamber (200) is denoted by $P_{200}$, a pressure in the third chamber (300) is denoted by $P_{300}$, a pressure in the fourth chamber (400) is denoted by $P_{400}$, a pressure in a fifth chamber (500), corresponding to a zone in which the bearings (9, 10) are arranged, is denoted by $P_{500}$, and the pressures in the chambers (100-500) are set as follows:

$$P_{300} < P_{200} \tag{1}$$

$$P_{50} < P_{200} \tag{2}$$

$$P_{300} < P_{400} \tag{3}$$

$$P_{500} < P_{400} \tag{4}$$

21. The method according to the claim 20, in which:

$$2 < P_{400} < 4 \text{ bar}, \tag{5}$$

$$P_{300} \leq P_{200} - 30000 \text{ Pa}, \tag{6}$$

$$P_{400} \geq P_{300} + 20000 \text{ Pa}, \tag{7}$$

$$P_{400} \geq P_{500} + 20000 \text{ Pa}, \tag{8}$$

$$P_{200} > P_{saturation} + 100000 \text{ Pa} \tag{9}$$

wherein $P_{saturation}$ means a vapor pressure of the barrier fluid at an adduction temperature in the buffer chamber (200), and in the condition in which the first chamber (50) and the buffer chamber (200) are immediately adjacent, without interposition of other chambers:

$$P_{200} > P_{50} + 80000 \text{ Pa} \tag{10}.$$

22. The method according to claim 16, wherein a pressure $P_{200}$ in the second chamber (200) is of at least 1 bar higher than a vapor pressure of the barrier fluid at an inlet temperature in the buffer chamber (200).

23. The method according to claim 16, comprising one or more of the additional steps:
   from the third chamber (300), withdrawing a mixture, if present therein, and condensing it at low temperature to separate the operating fluid leaked from the second chamber (200) from the gas leaked from the fourth chamber (400), so that the operating fluid is recovered;
   from the first chamber (100), recovering a portion of the barrier fluid if leaked through the seals (T1, T2) separating the first chamber (100) and the second chamber (200).

24. The method according to claim 16, wherein the gas is inert.

25. An organic Rankine cycle ORC plant for the production of electrical power and/or thermal energy, comprising at least one turbine according to claim 1 and a condenser (6), and comprising a separating assembly to separate contaminants from the operating fluid withdrawn from the third chamber (300), wherein the separating assembly comprises at least one among:
   a compressor (23) withdrawing the mixture of operating fluid and contaminants from the third chamber (300);
   a separating unit (22) provided with a chiller (27) to cool the mixture, at inlet temperatures;
   coalescent filters (28) intercepting the operating fluid,
   a return line (472) for the operating fluid the condenser (6) decontaminated, and
   optionally, a vent pipe (26) for venting in the atmosphere the fraction of inert gas or air separated from the operating fluid.

26. The plant according to claim 25, further comprising:
   a line conveying the operating fluid in liquid phase from the condenser (6) towards the buffer chamber (200);
   a feeding pump (7) placed along the afore said line;
   at least one filter (18) placed along the afore said line;
   a relief valve (19) to vent the operating fluid from the afore said line towards the condenser (6) when a threshold pressure is exceeded.

27. The plant according to claim 26, wherein the filters (18) are two, one upstream of the feeding pump (7) and protecting the same pump from a possible solid particulate, and the other one downstream of the feeding pump (7) and intercepting fine particulate and possible water present therein.

* * * * *